US012198648B2

(12) United States Patent
Masuda

(10) Patent No.: US 12,198,648 B2
(45) Date of Patent: Jan. 14, 2025

(54) BOOST DC-DC CONVERTER AND LIQUID-CRYSTAL DISPLAY APPARATUS

(71) Applicant: Sharp Display Technology Corporation, Kameyama (JP)

(72) Inventor: Akihiro Masuda, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/229,211

(22) Filed: Aug. 2, 2023

(65) Prior Publication Data

US 2024/0071328 A1 Feb. 29, 2024

(30) Foreign Application Priority Data

Aug. 23, 2022 (JP) ................................ 2022-132321

(51) Int. Cl.
*G09G 3/36* (2006.01)
*G09G 3/20* (2006.01)

(52) U.S. Cl.
CPC ......... *G09G 3/3611* (2013.01); *G09G 3/2096* (2013.01); *G09G 2310/061* (2013.01); *G09G 2330/021* (2013.01)

(58) Field of Classification Search
CPC ..... G09G 3/2092–2096; G09G 3/3611; G09G 3/3648; G09G 3/3685–3696; G09G 5/003–006; G09G 5/18; G09G 2310/0243; G09G 2310/06–08; G09G 2330/02–028; H02M 1/0025–0041; H02M 1/14–15; H02M 3/156–157
See application file for complete search history.

(56) References Cited

U.S. PATENT DOCUMENTS 5,657,215 A * 8/1997 Faulk ................ H02M 3/33507 363/41
9,450,492 B1 * 9/2016 Bizjak ..................... H02M 1/36
9,985,522 B1 * 5/2018 Luft ...................... H03K 5/1565
2002/0036636 A1 * 3/2002 Yanagi ................. G09G 3/3696 345/92
2010/0264891 A1 * 10/2010 Lee ....................... H02M 3/158 323/282

(Continued)

FOREIGN PATENT DOCUMENTS

JP 2013-229977 A 11/2013
JP 2020-155203 A 9/2020
KR 2016083577 A * 7/2016 .............. G09G 3/20

*Primary Examiner* — Keith L Crawley
(74) *Attorney, Agent, or Firm* — ScienBiziP, P.C.

(57) ABSTRACT

A switching control circuit is included in a boost direct current to direct current (DC-DC) converter generating an analog power supply voltage to be supplied to a source driver. The switching control circuit supplies a switching pulse to a control terminal of a switching element varying an inductor current such that an operation mode transitions to a current continuation mode during a first predetermined period that is at least a portion of a time duration that continues from a moment when the operation mode transitions from the current continuation mode to a current discontinuation mode in response to transitioning from an efficient video period to a vertical blanking period to a moment when the vertical blanking period transitions to the effective video period.

5 Claims, 8 Drawing Sheets

(56) References Cited

U.S. PATENT DOCUMENTS

| | | | | |
|---|---|---|---|---|
| 2013/0063414 | A1* | 3/2013 | Huang | G06F 1/3265 345/213 |
| 2015/0116300 | A1* | 4/2015 | Yamaki | G02F 1/1368 345/212 |
| 2017/0061860 | A1* | 3/2017 | Park | G09G 3/3648 |
| 2017/0213510 | A1* | 7/2017 | Takenaka | H02M 3/156 |
| 2019/0172379 | A1* | 6/2019 | Park | G09G 3/20 |
| 2020/0305262 | A1 | 9/2020 | Yamamoto | |
| 2021/0280121 | A1* | 9/2021 | Nam | G09G 3/3685 |

* cited by examiner

| | |
|---|---|
| ST1 | 4 |
| W1 | 11 |
| ST2 | 0 |
| W2 | 0 |

| | |
|---|---|
| ST1 | 8 |
| W1 | 4 |
| ST2 | 1 |
| W2 | 5 |

BOOST DC-DC CONVERTER AND LIQUID-CRYSTAL DISPLAY APPARATUS

BACKGROUND

1. Field

The present disclosure relates to boost direct current to direct current (DC-DC) converters, in particular, a DC-DC converter that generates a power supply voltage that is supplied to a source driver (video signal line driver circuit) in a liquid-crystal display apparatus.

2. Description of the Related Art

A liquid-crystal display apparatus used in portable electronics includes a power supply circuit with a boost DC-DC converter to generate a power supply voltage used to drive liquid crystals. The boost DC-DC converter generates an analog power supply voltage as high as about 10.4 V for the source driver by boosting a system power supply voltage as high as about 3.3 V.

When load is heavier, the boost DC-DC converter typically operates in a current continuation mode in which a current continuously flows through an inductor and when the load is lighter, the boost DC-DC converter typically operates in a current discontinuation mode in which no current flows through the inductor. The boost DC-DC converter used in a liquid-crystal display apparatus operates in the current continuation mode because the load is heavier for an effective video period (effective vertical scanning period) and operates in the current discontinuation mode because the load is lighter for a vertical blanking period.

An output voltage of the boost DC-DC converter is concerned with how a ripple voltage is to be reduced. Japanese Unexamined Patent Application Publication No. 2013-229977 discloses an image forming apparatus that may improve a power conversion efficiency during a light-load operation while controlling the ripple voltage in the output voltage of the boost DC-DC converter to an acceptable range. The image forming apparatus performs control in which a switching frequency is increased if the peak value of the ripple voltage falls outside a range between a lower limit voltage and an upper limit voltage and the switching frequency is decreased if the peak value of the ripple voltage falls within the range between the lower limit voltage and the upper limit voltage.

Japanese Unexamined Patent Application Publication No. 2020-155203 discloses a technique that controls an output voltage to within a set range. The technique is related to a light source device supplied with a power supply voltage from a boost DC-DC converter. In order to protect a light emitting element from an overcurrent, the boost DC-DC converter stops supplying the power supply voltage when a first potential difference between both ends of a specific resistor in the light source device becomes higher than a predetermined value during a drive-disabled state.

In the liquid-crystal apparatus with the boost DC-DC converter, the output voltage of the boost DC-DC converter (specifically, an analog power supply voltage supplied to the source driver) may occasionally greatly drop in voltage value during the vertical blanking period (a time duration while the boost DC-DC converter operates in the current discontinuation mode). This variation is hereinafter referred to as a voltage drop. If the voltage drop occurs during the vertical blanking period, an analog power supply voltage high enough to drive liquid crystals may be difficult, depending on the timing of the occurrence of the voltage drop, to obtain immediately after the vertical blanking period transitions to the effective video period. This is further described as below.

FIG. 9 illustrates the waveform of a switching pulse SWP supplied to a control terminal of a switching element that is arranged to vary a current flowing through an inductor in the boost DC-DC converter. FIG. 9 also illustrates the waveform of an analog power supply voltage AVDD as the output voltage of the boost DC-DC converter. The switching pulse SWP is illustrated as a portion denoted reference numeral 91 in FIG. 10. In practice, however, a control signal SC including the switching pulse SWP has a waveform denoted by reference numeral 92 in FIG. 10. FIG. 9 illustrates the effective video period PA and the vertical blanking period PB.

Referring to FIG. 9, except a time duration immediately after a period transition, the switching pulse SWP is generated at a relatively higher frequency for the effective video period PA and is generated at a relatively lower frequency for the vertical blanking period PB. In this way, the boost DC-DC converter operates in the current continuation mode for the effective video period PA and operates in the current discontinuation mode for the vertical blanking period PB. Referring to FIG. 9, the voltage value of the analog power supply voltage AVDD starts to drop at time t91 during the vertical blanking period PB. In response, the voltage value of the analog power supply voltage AVDD remains lower than a desired voltage value until time t92 during the effective video period PA. The analog power supply voltage AVDD high enough to drive the liquid crystals is not obtained immediately after the vertical blanking period PB transitions to the effective video period PA. This may lead to a degradation in display quality.

FIG. 11 illustrates variations in more realistic waveforms. Specifically, FIG. 11 illustrates a vertical synchronization signal Vsync and a horizontal synchronization signal Hsync. Referring to FIG. 11, the generation frequency of the switching pulse SWP varies in synchronization with the period transition. In this example, during the vertical blanking period PB, the analog power supply voltage AVDD is lowered after being raised once. The switching pulse SWP is generated at a relatively higher frequency immediately after the start of the effective video period PA but the voltage value of the analog power supply voltage AVDD is lowered greatly below a predetermined desirable value. In this example, as well, the display quality is degraded.

In view of the above, the boost DC-DC converter is controlled such that the analog power supply voltage AVDD equal to a voltage value higher than a voltage value actually used to drive the liquid crystals (for example, a voltage value higher than by 0.1 V than the desirable value) is output as the output voltage. This may lead to an increase in power consumption.

It is desirable to provide a boost DC-DC converter that consumes power lower than in the related art and, even when a voltage drop occurs in an output voltage during a light-load state, provides an output voltage having a high-enough magnitude after the light-load state transitions to a heavy-load state.

SUMMARY

According to a first aspect of the disclosure, there is provided a boost direct current to direct current (DC-DC) converter boosting a power supply voltage supplied from outside and including: an input terminal that is supplied with the power supply voltage; an inductor having a first end connected to the input terminal; a switching element having a control terminal, a first conductive terminal connected to a second end of the inductor, and a second conductive terminal grounded; a switching control circuit that supplies the control terminal of the switching element with a control signal that controls a switching frequency of the switching element; a capacitance element having a first end grounded; a rectifying element that allows a current to flow only from the second end of the inductor to a second end of the capacitance element; and an output terminal that is connected to the second end of the capacitance element and outputs a power supply voltage that is boosted, wherein the switching control circuit supplies the control terminal of the switching element with the control signal such that an operation mode transitions to a current continuation mode during a first predetermined period that is at least a portion of a time duration that continues from a moment when the operation mode transitions from the current continuation mode to a current discontinuation mode in response to transitioning from a heavy-load period to a light-load period to a moment when the light-load period transitions to the heavy-load period.

According to a second aspect of the disclosure, there is provided a liquid-crystal display apparatus including: the boost DC-DC converter according to the first aspect of the disclosure; a display including a plurality of video signal lines, a plurality of scanning signal lines, and a plurality of pixel formation units that are respectively arranged at intersections of the video signal lines and the scanning signal lines; a video signal line driver circuit that drives the video signal lines; a scanning signal line driver circuit that drives the scanning signal lines; and a timing control circuit that controls an operation of the video signal line driver circuit, the scanning signal line driver circuit, and the switching control circuit.

DESCRIPTION OF THE EMBODIMENTS

Embodiments of the disclosure are described with reference to the drawings.

1. First Embodiment

1.1 Entire Configuration and Operation

Figure 2:
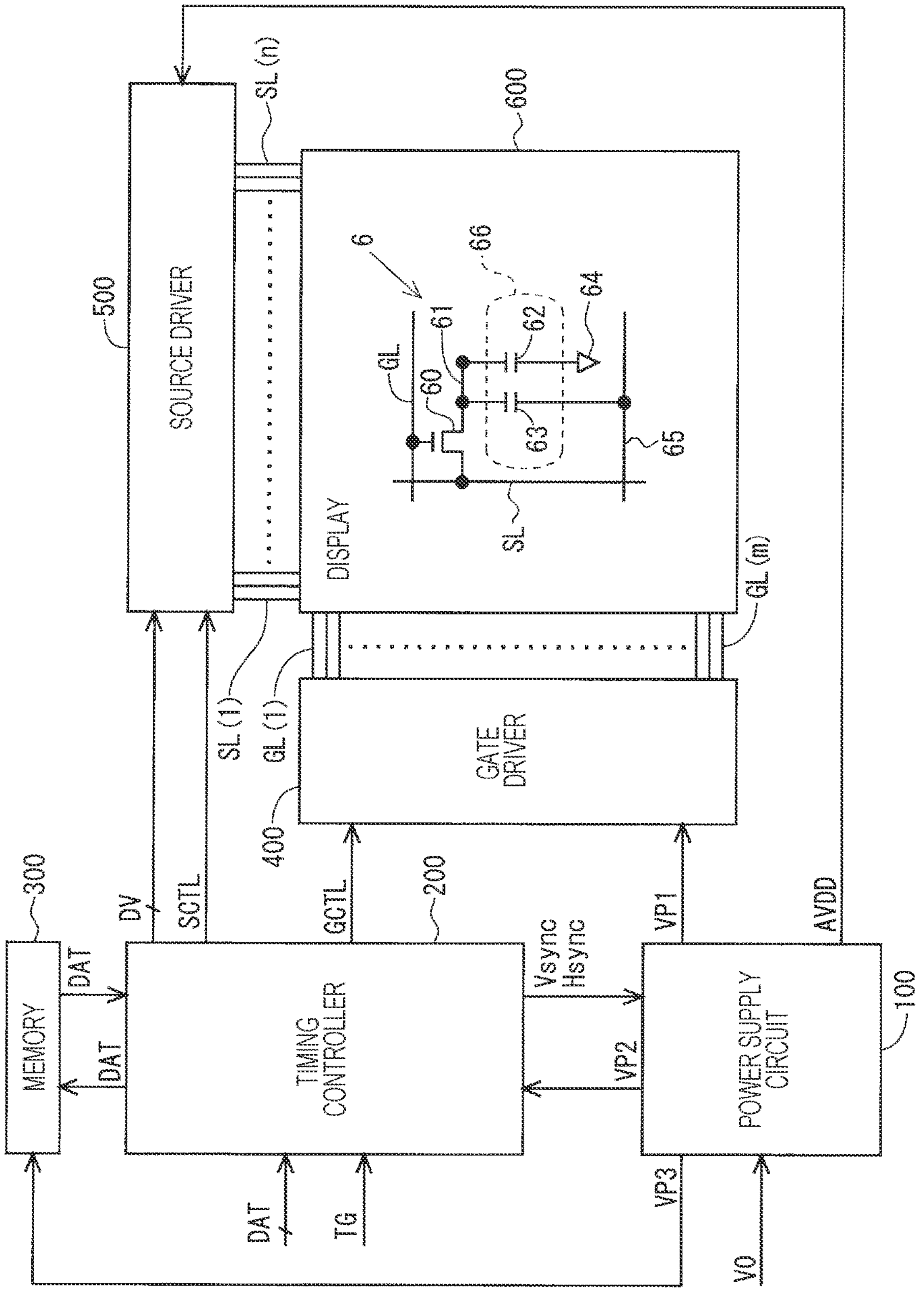
FIG. 2 is a block diagram illustrating an entire configuration of a liquid-crystal display apparatus of a first embodiment.

FIG. 2 is a block diagram illustrating an entire configuration of a liquid-crystal display apparatus of a first embodiment. The liquid-crystal display apparatus includes a power supply circuit 100, a timing controller (timing control circuit) 200, a memory 300, a gate driver (scanning signal line driver circuit) 400, a source driver (video signal line driver circuit) 500, and a display 600. FIG. 2 is a functional block diagram and is thus different from an actual position relationship of elements.

The display 600 includes n source bus lines (video signal lines) SL(1) through SL(n) and m gate bus lines (scanning signal lines) GL(1) through GL(m). Pixel formation units 6 forming pixels are respectively arranged at the intersections of the n source bus lines SL(1) through SL(n) and the m gate bus lines GL(1) through GL(m). Specifically, the display 600 includes n×m pixel formation units 6. Each pixel formation unit 6 includes a pixel thin-film transistor (TFT) 60 having a control terminal connected to the gate bus line GL passing through the corresponding intersection and a first conductive terminal connected to the source bus line SL passing through the corresponding intersection. Each pixel formation unit 6 further includes a pixel electrode 61 connected to a second conductive terminal of the TFT 60, a common electrode 64 commonly arranged to the n×m pixel formation units 6 and an auxiliary capacitance electrode 65, a liquid-crystal capacitance 62 formed by the pixel electrode 61 and the common electrode 64, and an auxiliar capacitance 63 formed by the pixel electrode 61 and the auxiliary capacitance electrode 65. A pixel capacitance 66 is formed by the liquid-crystal capacitance 62 and the auxiliar capacitance 63. FIG. 2 illustrates only one pixel formation unit 6. The display 600 is herein rectangular. Alternatively, the display 600 may be non-rectangular.

Operation of the elements in FIG. 2 is described below. By level-converting a system power supply voltage VO, the power supply circuit 100 generates power supply voltages VP1 through VP3 for logic operation and the analog power supply voltage AVDD for driving liquid crystals. The power supply voltages VP1 through VP3 for the logic operation may not necessarily be different from each other. When the analog power supply voltage AVDD is generated, the vertical synchronization signal Vsync and the horizontal synchronization signal Hsync provided by the timing controller 200 are referenced.

The timing controller 200 controls the operation of the power supply circuit 100, the gate driver 400, and the source driver 500. Specifically, the timing controller 200 receives, from the outside, image data DAT and timing signal group TG (such as the horizontal synchronization signal Hsync and the vertical synchronization signal Vsync) and then outputs a digital video signal DV, the vertical synchronization signal Vsync and the horizontal synchronization signal Hsync to be supplied to the power supply circuit 100, a gate control signal GCTL that controls the operation of the gate driver 400, and a source control signal SCTL that controls the operation of the source driver 500. The gate control signal GCTL includes a gate start pulse signal, a gate clock signal, and the like. The source control signal SCTL includes a source start pulse signal, a source clock signal, a latch strobe signal, and the like.

The memory 300 stores the image data DAT for one frame. The writing of the image data DAT onto the memory 300 and the reading of the image data DAT from the memory 300 are controlled by the timing controller 200.

In response to the gate control signal GCTL from the timing controller 200, the gate driver 400 periodically applies an active scanning signal to each gate bus line GL every vertical scanning period. Specifically, the gate driver 400 drives the m gate bus lines GL(1) through GL(m).

The source driver 500 applies a driving video signal to each source bus line SL in response to the digital video signal DV and the source control signal SCTL transmitted from the timing controller 200. At the timing of the generation of a pulse of the source clock signal, the source driver 500 successively stores the digital video signal DV indicating a voltage to be applied to each source bus line SL. The digital video signal DV stored is converted into an analog voltage at the timing of the generation of a pulse of the latch strobe signal. The converted analog signal is applied as the driving video signal to the n source bus lines SL(1) through SL(n) at a time. In this way, the source driver 500 drives the n source bus lines SL(1) through SL(n). The source driver 500 includes a gradation voltage generator circuit that generates the analog power supply voltage AVDD from an analog voltage responsive to each gradation value indicated by the digital video signal DV.

An image responsive to the image data DAT coming in from the outside is displayed on the display 600 by applying a scanning signal to the gate bus line GL and a driving video signal to the source bus line SL.

1.2 Configuration of Boost DC-DC Converter

Figure 3:
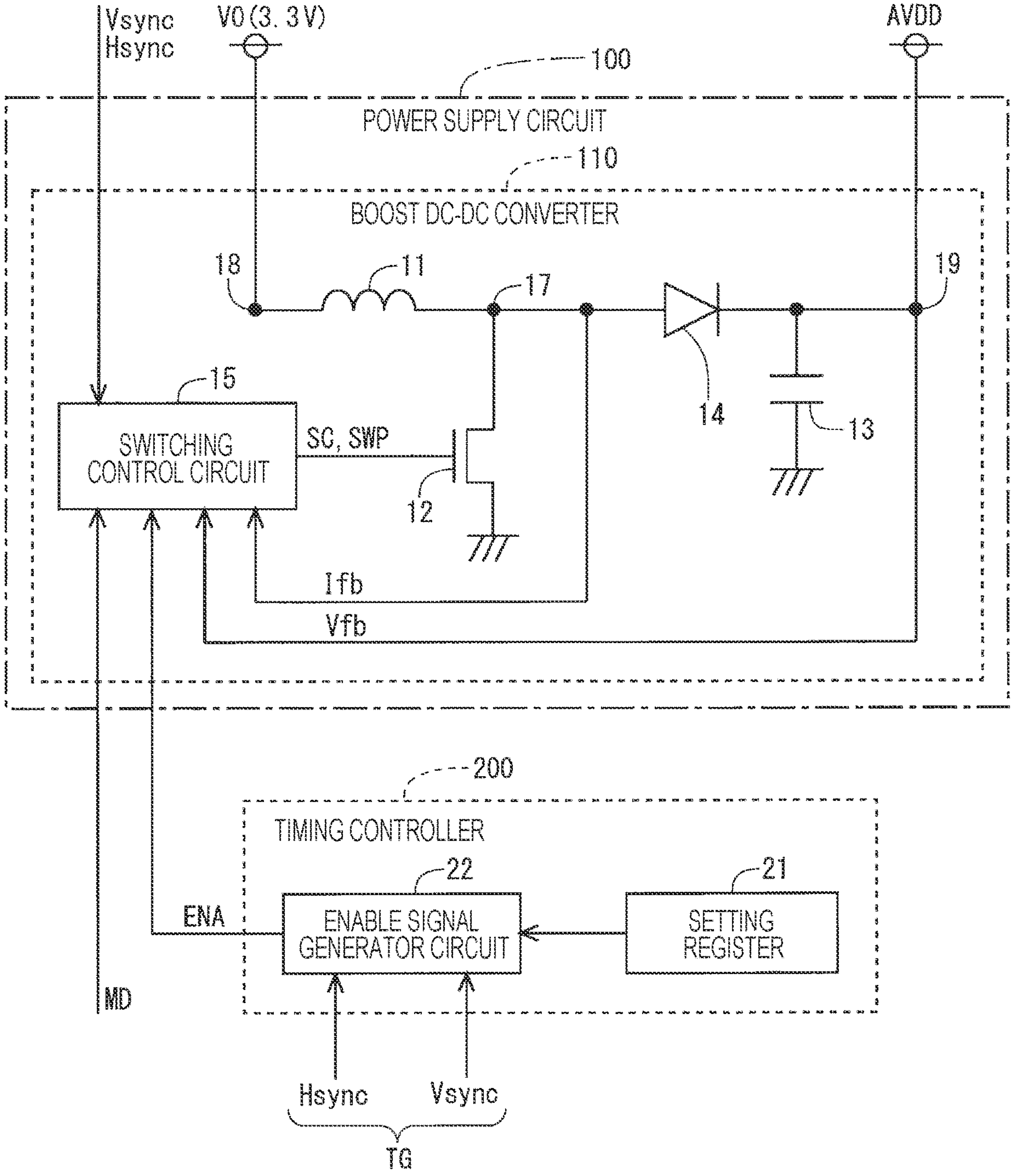
FIG. 3 illustrates a configuration that generates an analog power supply voltage from a system power supply voltage in the first embodiment.

FIG. 3 illustrates a configuration that generates the analog power supply voltage AVDD in response to the system power supply voltage VO. From among the DC-DC converters included in the power supply circuit 100, FIG. 3 illustrates only a boost DC-DC converter 110 that generates the analog power supply voltage AVDD that is supplied to the source driver 500.

The boost DC-DC converter 110 includes, in addition to an input terminal 18 and an output terminal 19, a coil (inductor) 11, a thin-film transistor 12 serving as a switching element that varies an inductor current (a current flowing through the coil 11), a capacitor 13 serving as a capacitance element, a diode 14 serving as a rectifying element, and a switching control circuit 15. The input terminal 18 is supplied with the system power supply voltage VO of 3.3 V. One end of the coil 11 is connected to the input terminal 18 while the other end of the coil 11 is connected to a node 17. The thin-film transistor 12 has the control terminal supplied with the control signal SC (the control signal SC including the switching pulse SWP) output from the switching control circuit 15, the first conductive terminal connected to the node 17 (in other words, the other end of the coil 11), and the second conductive terminal grounded. The capacitor 13 has one end grounded and the other end connected to the output terminal 19. The diode 14 has an anode connected to the node 17 and a cathode connected to the output terminal 19. In other words, the diode 14 allows a current to only flow from the other end of the coil 11 to the other end of the capacitor 13. The switching control circuit 15 references a mode signal MD while outputting the control signal SC controlling an on/off operation of the thin-film transistor 12. The switching control circuit 15 outputs the control signal SC in response to the vertical synchronization signal Vsync, the horizontal synchronization signal Hsync, a feedback voltage Vfb, a feedback current Ifb, and an enable signal ENA output from an enable signal generator circuit 22 in the timing controller 200. The output terminal 19 is connected to the source driver 500 and the voltage at the other end of the capacitor 13 is output from the capacitor 13 as the analog power supply voltage AVDD. The analog power supply voltage AVDD as a power supply voltage boosted by the boost DC-DC converter 110 is thus supplied to the source driver 500.

As described above, the switching control circuit 15 is supplied with the feedback voltage Vfb and the feedback current Ifb. According to the first embodiment, a control method called current mode control is employed. The disclosure is not limited to the current mode control. A control method (only voltage is fed back) called voltage control may also be employed.

In the liquid-crystal display apparatus including the power supply circuit 100 having the boost DC-DC converter 110, one frame period includes an effective video period and a vertical blanking period. During the effective video period, the source driver 500 applies an effective driving video signal to the n source bus lines SL(1) through SL(n) and the gate driver 400 successively selects one by one the m gate bus lines GL(1) through GL(m). During the vertical blanking period, the gate driver 400 stops selecting the gate bus line GL. The boost DC-DC converter 110 operates in the effective video period as a heavy-load period while operating in the vertical blanking period as a light-load period.

Basically, when the vertical blanking period transitions to the effective video period, the switching control circuit 15 supplies the control terminal of the thin-film transistor 12 with the control signal SC such that an operation mode remains in a current continuation mode. When the effective video period transitions to the vertical blanking period, the switching control circuit 15 supplies the control terminal of the thin-film transistor 12 with the control signal SC such that the operation mode remains in a current discontinuation mode. However, the switching control circuit 15 supplies the control terminal of the thin-film transistor 12 with the control signal SC such that the operation mode transitions to the current continuation mode during at least a portion (a first predetermined period) of a time duration that continues from a moment when the operation mode transitions from the current continuation mode to the current discontinuation mode in response to transitioning from the effective video period to the vertical blanking period to a moment when the vertical blanking period transitions to the effective video period. Specifically, the control terminal of the thin-film transistor 12 is forcibly supplied with the switching pulse SWP having a relatively high frequency during the first predetermined period even in the vertical blanking period.

The timing controller 200 includes a setting register 21 and the enable signal generator circuit 22. The setting register 21 stores, as set values, a value identifying a rising point of a pulse included in the enable signal ENA and a value identifying a pulse width of the pulse. The enable signal generator circuit 22 generates the enable signal ENA in response to the set values stored on the setting register 21 while referencing the horizontal synchronization signal Hsync and the vertical synchronization signal Vsync. The enable signal ENA generated by the enable signal generator circuit 22 is supplied to the switching control circuit 15 in the boost DC-DC converter 110.

Figure 4:
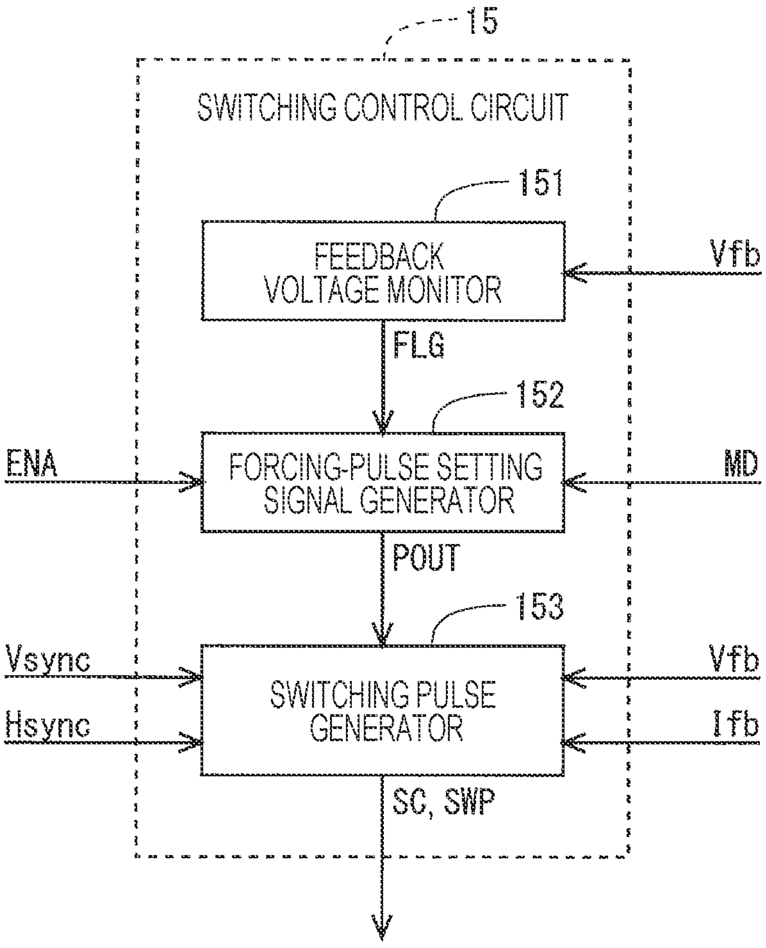
FIG. 4 is a block diagram illustrating a configuration of a switching control circuit in the first embodiment.

FIG. 4 is a block diagram illustrating a configuration of the switching control circuit 15. Referring to FIG. 4, the switching control circuit 15 includes a feedback voltage monitor 151, a forcing-pulse setting signal generator 152 and a switching pulse generator 153.

The feedback voltage monitor 151 monitors the feedback voltage Vfb (namely, a boosted power supply voltage) and generates the flag signal FLG representing the monitoring results. Specifically, the feedback voltage monitor 151 compares a voltage value of the feedback voltage Vfb with a predetermined threshold and then generates the flag signal FLG representing the comparison results. According to the first embodiment, the voltage level of the flag signal FLG is maintained at a low level (with the flag in an off state). When the voltage value of the feedback voltage Vfb exceeds the threshold, the voltage value of the feedback voltage Vfb is maintained at a high level (with the flag in an on state) for a time duration having a predetermined time length (second predetermined period) from a moment when the feedback voltage monitor 151 detects the voltage value of the feedback voltage Vfb in excess of the threshold.

While referencing the mode signal MD, the forcing-pulse setting signal generator 152 generates, in response to the flag signal FLG and the enable signal ENA, the forcing pulse setting signal POUT that forcibly causes the switching pulse generator 153 to generate the switching pulse SWP. The mode signal MD indicates whether a control mode is a first mode or a second mode. If the control mode is the first mode, the flag signal FLG is determined to be valid and if the control mode is the second mode, the flag signal FLG is determined to be invalid. If the mode signal MD indicates that the control mode is the first mode, the forcing-pulse setting signal generator 152 outputs as the forcing pulse setting signal POUT a signal corresponding to a logical AND of the flag signal FLG and the enable signal ENA. If the mode signal MD indicates that the control mode is the second mode, the forcing-pulse setting signal generator 152 outputs as the forcing pulse setting signal POUT a signal having the same waveform as the enable signal ENA.

The analog power supply voltage AVDD having a desired voltage value is generated. To this end, in response to the vertical synchronization signal Vsync, the horizontal synchronization signal Hsync, the feedback voltage Vfb and the feedback current Ifb, the switching pulse generator 153 generates the control signal SC such that the switching pulse SWP is generated at a relatively high frequency for the effective video period and the switching pulse SWP is generated at a relatively low frequency for the vertical blanking period. In response to the forcing pulse setting signal POUT, the switching pulse generator 153 generates the control signal SC such that the switching pulse SWP is generated at a relatively high frequency even for the vertical blanking period. According to the first embodiment, the control signal SC including the switching pulse SWP at a relatively high frequency is generated while the forcing pulse setting signal POUT is maintained at a higher level.

If the control mode is the first mode, the switching control circuit 15 sets, to be the first predetermined period, a time duration while a period (second predetermined period) having a predetermined time length from a moment when a boosted power supply voltage exceeds a threshold overlaps a period throughout which a pulse included in the enable signal ENA occurs. The switching control circuit 15 supplies the control terminal of the thin-film transistor 12 with the control signal SC including the switching pulse SWP at a relatively high frequency such that the operation mode transitions to the current continuation mode during the first predetermined period. On the other hand, if the control mode is the second mode, the switching control circuit 15 sets, to be the first predetermined period, a time duration which the pulse included in the enable signal ENA occurs and the switching control circuit 15 supplies the control terminal of the thin-film transistor 12 with the control signal SC including the switching pulse SWP at a relatively high frequency such that the operation mode transitions to the current continuation mode during the first predetermined period.

1.3 Measure Applied to Voltage Drop

Measure applied to the voltage drop is described below.

1.3.1 Outline

Figure 1:
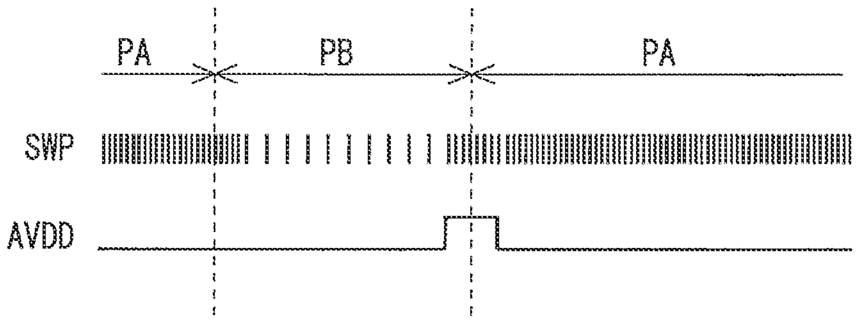
FIG. 1 is a waveform diagram illustrating a measure taken to a voltage drop.
Figure 9:
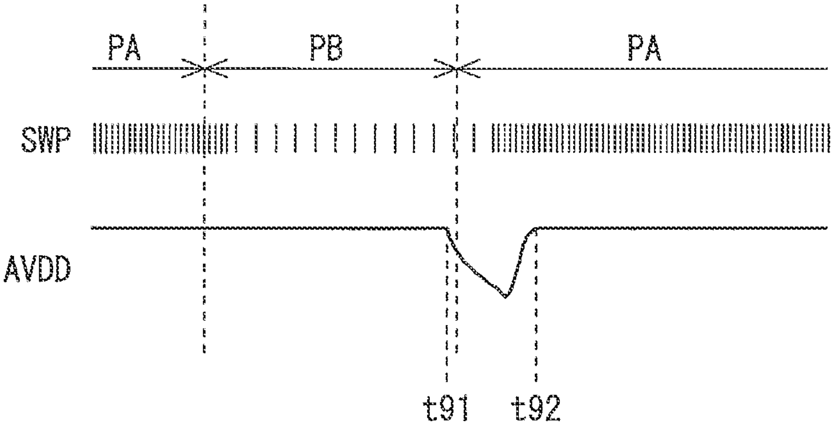
FIG. 9 is a waveform diagram illustrating the effect of a voltage drop in the related art.
Figure 10:
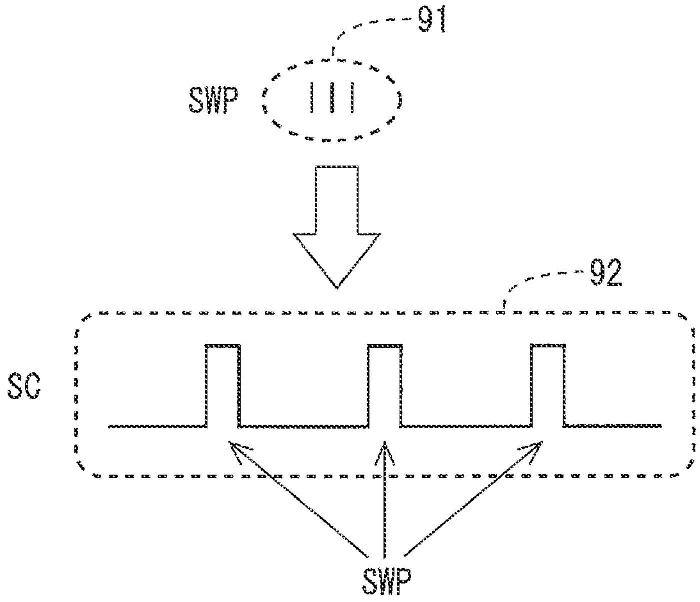
FIG. 10 illustrates a switching pulse.
Figure 11:
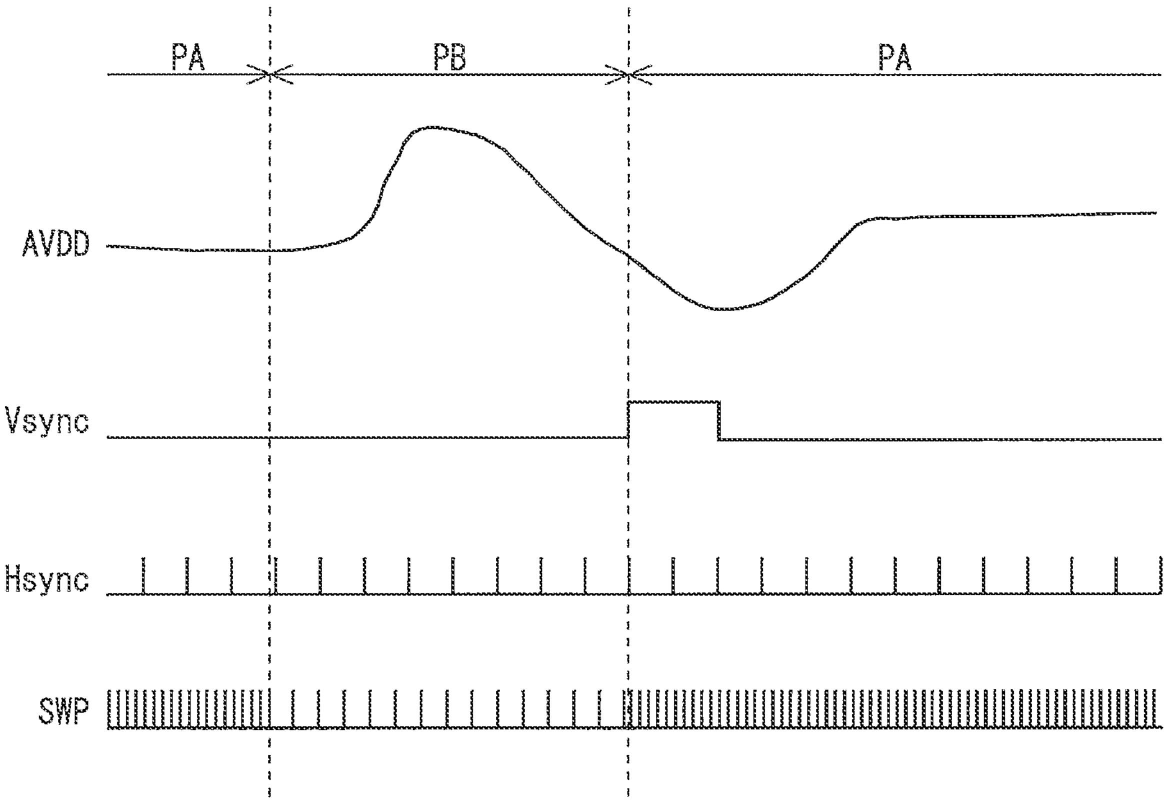
FIG. 11 is a practical waveform diagram of signals related to a boost DC-DC converter of the related art.

The outline of a measure applied to the voltage drop is described with reference to FIG. 1. In the related art, if a generation frequency of the switching pulse SWP (switching frequency of the thin-film transistor 12) becomes a relatively low frequency after the effective video period PA transitions to the vertical blanking period PB, the generation frequency of the switching pulse SWP maintains at a relatively low frequency until the vertical blanking period PB transitions to the effective video period PA (See FIGS. 9 and 11). According to the first embodiment, as illustrated in FIG. 1, the switching control circuit 15 generates the switching pulse SWP at a relatively high frequency for a predetermined period (the first predetermined period) before the vertical blanking period PB transitions to the effective video period PA after the switching pulse SWP changes to a relatively low frequency in response to the transitioning from the effective video period PA to the vertical blanking period PB. By increasing the switching frequency of the thin-film transistor 12 before the vertical blanking period PB transitions to the effective video period PA, the analog power supply voltage AVDD high enough to drive the liquid crystals may be output from the boost DC-DC converter 110 even if a voltage drop occurs during the vertical blanking period PB.

1.3.2 Detailed Control

Detailed control of the boost DC-DC converter 110 is described below. It is noted that the mode signal MD indicates that the control mode is the first mode. Control with the mode signal MD indicating that the control mode is the second mode will be described with reference to a second embodiment.

Figures 5, 6:
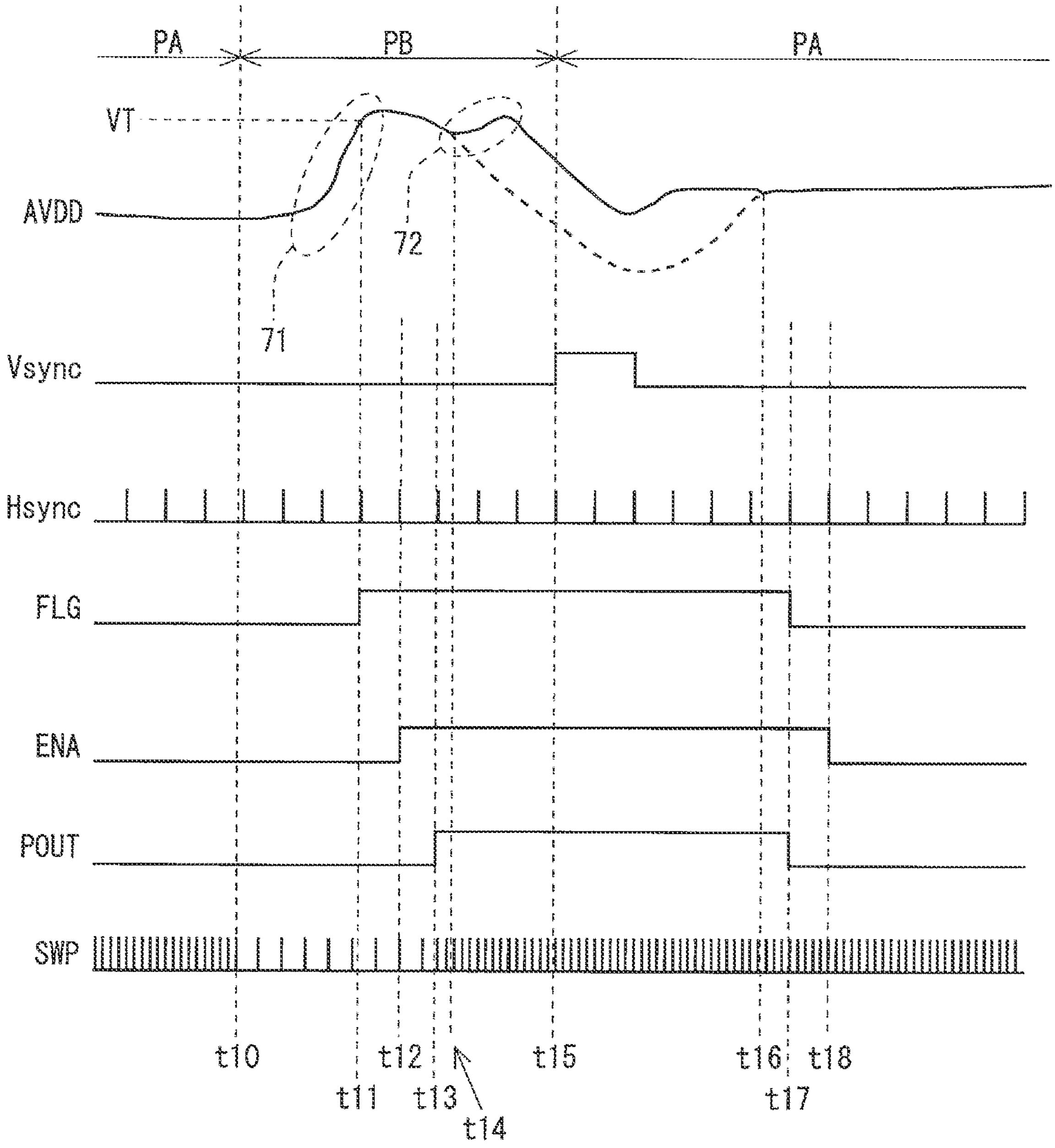
FIG. 5 is a waveform diagram illustrating an operation of a boost DC-DC converter in the first embodiment.
FIG. 6 illustrates set values stored on a setting register in the first embodiment.

FIG. 5 is a waveform diagram illustrating the operation of the boost DC-DC converter 110. A portion of the waveform of the analog power supply voltage AVDD in FIG. 5 denoted by broken line from time t14 to time t16 is obtained when the measure disclosed in the specification is not taken.

The time duration prior to time t10 is the effective video period PA. During the effective video period PA, the switching pulse SWP at a relatively high frequency is generated. Specifically, the boost DC-DC converter 110 operates in the current continuation mode. During the time duration, the flag signal FLG, the enable signal ENA, and the forcing pulse setting signal POUT are kept at a lower level.

At time t10, the effective video period PA transitions to the vertical blanking period PB. The generation frequency of the switching pulse SWP changes to a relatively low frequency. Specifically, the switching pulse generator 153 (see FIG. 4) changes the generation frequency of the switching pulse SWP from a relatively high frequency to a relatively low frequency. The switching pulse generator 153 may detect the timing of transitioning from the effective video period PA to the vertical blanking period PB by counting pulses of the horizontal synchronization signal Hsync from the generating timing of the pulse of the vertical synchronization signal Vsync. Referring to FIG. 5, the generation frequency of the switching pulse SWP changes at the time when the effective video period PA transitions to the vertical blanking period PB. However, there is a case in which the generation frequency of the switching pulse SWP changes when a predetermined time duration elapses from the transition from the effective video period PA to the vertical blanking period PB (see FIG. 1).

The analog power supply voltage AVDD gradually rises in voltage value during the vertical blanking period PB as illustrated in a portion 71 in FIG. 5. At time t11, the voltage value of the analog power supply voltage AVDD exceeds a predetermined threshold VT. The feedback voltage monitor 151 (see FIG. 4) determines that the voltage value of the feedback voltage Vfb exceeds the threshold VT. The feedback voltage monitor 151 then causes the flag signal FLG to transition from a low level to a high level. The state that the flag signal FLG is at a high level is maintained for a predetermined period (11 horizontal scanning periods in FIG. 5).

At time t12, the enable signal ENA transitions from a low level to a high level. The enable signal ENA is generated by the enable signal generator circuit 22 in the timing controller 200 (see FIG. 3) as described below. The generation of the enable signal ENA is based on the set value stored on the setting register 21 in the timing controller 200.

According to the second embodiment, the set value is stored on the setting register 21 as illustrated in FIG. 6. As described above, the setting register 21 stores as the set values the value identifying the rising time of the pulse included in the enable signal ENA and the value identifying the pulse width of the pulse. Referring to FIG. 6, ST1 identifies the rising point of a first pulse included in the enable signal ENA and W1 identifies the pulse width of the first pulse included in the enable signal ENA. ST2 identifies the rising point of a second pulse included in the enable signal ENA and W2 identifies the pulse width of the second pulse included in the enable signal ENA. In this example, the value of ST2 and the value of W2 are "0." The enable signal generator circuit 22 thus generates the enable signal ENA such that one pulse is generated during the vertical blanking period PB. Referring to FIG. 6, the value of ST1 is "4." The enable signal generator circuit 22 then transitions the enable signal ENA from a low level to a high level four horizontal scanning periods before the transition from the vertical blanking period PB to the effective video period PA (namely, four horizontal scanning periods before the rising time of the vertical synchronization signal Vsync). W1 is "11" in FIG. 6. The enable signal generator circuit 22 then transitions the enable signal ENA from a high level to a low level 11 horizontal scanning periods after the enable signal ENA transitions from a low level to a high level. In this way, the enable signal generator circuit 22 generates the enable signal ENA including a pulse having a pulse width equal to 11 horizontal scanning periods.

Since the control mode is the first mode in this case, the flag signal FLG is valid and the forcing-pulse setting signal generator 152 (see FIG. 4) outputs the forcing pulse setting signal POUT corresponding to a signal of the logical AND of the flag signal FLG and the enable signal ENA. With this respect, both the flag signal FLG and the enable signal ENA are at a high level at time t13 when the pulse of the horizontal synchronization signal Hsync occurs first after the enable signal ENA transitions from a low level to a high level at time t12. Referring to FIG. 5, the forcing pulse setting signal POUT transitions from a low level to a high level at time 13. In response to the transition of the forcing pulse setting signal POUT from a low level to a high level, the switching pulse generator 153 changes the generation frequency of the switching pulse SWP from a relatively low frequency to a relatively high frequency. At time t13, the switching frequency of the thin-film transistor 12 becomes higher. For a time duration subsequent to time t13, the boost DC-DC converter 110 operates in the current continuation mode.

At time t15, the vertical blanking period PB transitions to the effective video period PA. At time t17, the flag signal FLG transitions from a high level to a low level. In response, the forcing pulse setting signal POUT transitions from a high level to a low level. At time t17, the forcing pulse setting signal POUT transitions to a low level but since time t17 is included in the effective video period PA, the generation frequency of the switching pulse SWP is maintained at a relatively high frequency. At time t18, the enable signal ENA transitions from a high level to a low level.

In this example, the time duration from time t13 to time t17 corresponds to the first predetermined period and the time duration from t11 to time t17 corresponds to the second predetermined period.

The following discussion focuses on the waveform of the analog power supply voltage AVDD for the time duration from time t14 to time t16. A waveform denoted by a broken line in FIG. 5 may result if the measure described in the specification is not taken and the voltage value of the analog power supply voltage AVDD is substantially lower than a desired voltage value for a time duration immediately after the transition from the vertical blanking period PB to the effective video period PA. According to the first embodiment, in contrast, the switching frequency of the analog power supply voltage AVDD of the thin-film transistor 12 is at a relatively high frequency subsequent to time t13. The voltage value of the analog power supply voltage AVDD thus rises in a portion 72 in FIG. 5. As a result, the voltage value of the analog power supply voltage AVDD is maintained high enough even for the time duration immediately after the transition from the vertical blanking period PB to the effective video period PA.

1.4 Effect

According to the first embodiment, the switching control circuit 15 in the boost DC-DC converter 110 sets to be a relatively high frequency the generation frequency of the switching pulse SWP supplied to the control terminal of the thin-film transistor 12 for a predetermined time duration prior to the transition from the vertical blanking period PB to the effective video period PA after the effective video period PA transitions to the vertical blanking period PB. The boost DC-DC converter 110 thus operates in the current continuation mode for the predetermined time duration prior to the transition from the vertical blanking period PB to the effective video period PA. As a result, even if a voltage drop occurs in the analog power supply voltage AVDD during the vertical blanking period PB, the analog power supply voltage AVDD high enough to drive the liquid crystals may be obtained immediately after the transition from the vertical blanking period PB to the effective video period PA. Instead of controlling the boost DC-DC converter to obtain an output voltage higher than an actually desired voltage value to achieve the above-described effect, a portion of the operation mode, which is the current discontinuation mode in the related art configuration, is simply modified to the current continuation mode in the first embodiment. The control related to the first embodiment involves only a slight increase in power consumption. According to the first embodiment, the boost DC-DC converter 110 consuming power lower than in the related art may provide a sufficiently higher output voltage subsequent to the transition from the vertical blanking period PB to the effective video period PA even when a voltage drop occurs in the output voltage during the vertical blanking period PB as a light-load period (the analog power supply voltage AVDD). A liquid-crystal display apparatus including the boost DC-DC converter 110 may thus be implemented.

2. Second Embodiment

2.1 Outline

The entire configuration of the liquid-crystal display apparatus, the configuration generating the analog power supply voltage AVDD from the system power supply voltage VO, and the configuration of the switching control circuit 15 remain unchanged from those of the first embodiment (see FIGS. 2 through 4). According to the first embodiment, the mode signal MD indicates that the control mode is the first mode. In a second embodiment, in contrast, the mode signal MD indicates that the control mode is the second mode (namely, the flag signal FLG is invalid). According to the first embodiment, the boost DC-DC converter 110 is controlled such that the pulse of the enable signal ENA is generated once every vertical blanking period PB. According to the second embodiment, in contrast, the boost DC-DC converter 110 is controlled such that the pulse of the enable signal ENA is generated twice every vertical blanking period PB. In the second embodiment, as well, the boost DC-DC converter 110 operates during the effective video period PA as a heavy-load period and during the vertical blanking period PB as a light-load period.

2.2 Measure Applied to Voltage Drop

Figures 7, 8:
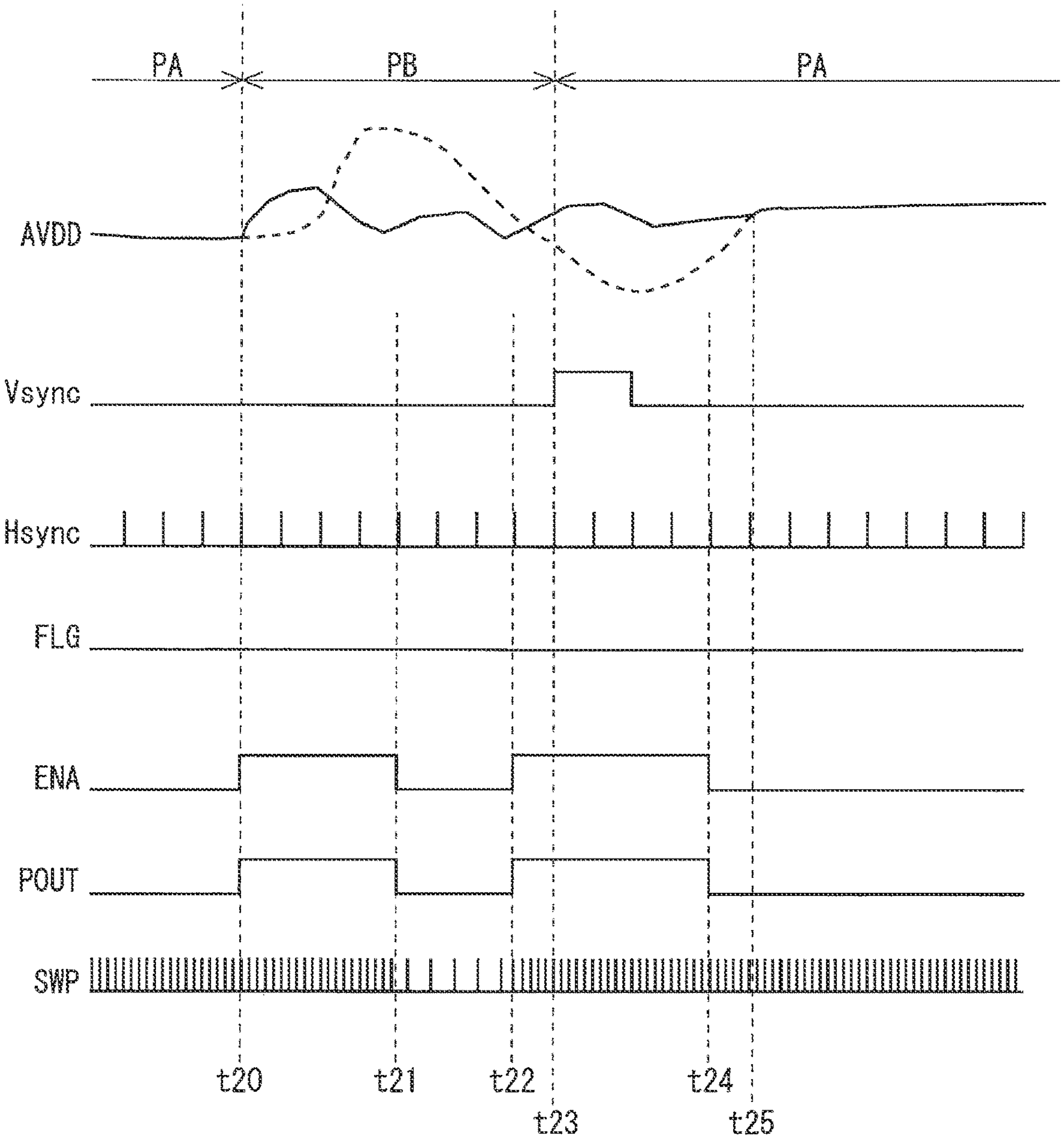
FIG. 7 is a waveform diagram illustrating the operation of a boost DC-DC converter in a second embodiment.
FIG. 8 illustrates set values stored on a setting register in the second embodiment.

A measure applied to the voltage drop is described below with reference to FIG. 7. FIG. 7 illustrates, out of the waveform of the analog power supply voltage AVDD, a waveform from time t20 through time t25 denoted by a broken line where the measure disclosed in the specification is not taken.

A time duration prior to time t20 is the effective video period PA. During the time duration, the switching pulse SWP having a relatively high frequency is generated. Specifically, the boost DC-DC converter 110 operates in the current continuation mode. The enable signal ENA and the forcing pulse setting signal POUT are maintained at a low level for the time duration. Since the flag signal FLG is invalid, the flag signal FLG is maintained at a low level for a time duration throughout which the liquid-crystal display apparatus operates.

At time t20, the effective video period PA transitions to the vertical blanking period PB. Also, at time t20, the enable signal ENA transitions from a low level to a high level. As illustrated in FIG. 8, the set values are stored on the setting register 21. The value of ST1 is "8," the value of W1 is "4," the value of ST2 is "1," and the value W2 is "5." The set values are stored on the setting register 21 such that the pulse of the enable signal ENA is generated twice every vertical blanking period PB. Since the value of ST1 is "8," the enable signal generator circuit 22 causes the enable signal ENA to transition from a low level to a high level eight horizontal scanning periods before the transition from the vertical blanking period PB to the effective video period PA. Since the control mode is the second mode (with the flag signal FLG being invalid), the forcing-pulse setting signal generator 152 outputs as the forcing pulse setting signal POUT a signal having the same waveform as the enable signal ENA. At time t20, the forcing pulse setting signal POUT also transitions from a low level to a high level. Although the effective video period PA transitions to the vertical blanking period PB in response to the transition of the forcing pulse setting signal POUT from a low level to a high level, the switching pulse generator 153 maintains the generation frequency of the switching pulse SWP at a relatively high frequency. As a result, at and subsequent to time t20, the operation mode of the boost DC-DC converter 110 is maintained in the current continuation mode.

With the value of W1 being "4," the enable signal generator circuit 22 causes the enable signal ENA from a high level to a low level four horizontal scanning periods after the enable signal ENA transitions from a low level to a high level. Specifically, at time t21, the enable signal ENA transitions from a high level to a low level. In response, the forcing pulse setting signal POUT transitions from a high level to a low level at time t21. The switching pulse generator 153 causes the generation frequency of the switching pulse SWP to transition from a relatively high frequency to a relatively low frequency in response to the transition of the forcing pulse setting signal POUT from a high level to a low level. At time t21, the operation mode of the boost DC-DC converter 110 is in the current discontinuation mode.

With the value of ST2 being "1," the enable signal generator circuit 22 causes the enable signal ENA to transition from a low level to a high level one horizontal scanning period before the vertical blanking period PB transitions to the effective video period PA. In this example, at time t22, the enable signal ENA transitions from a low level to a high level. In this example, at time t22, the enable signal ENA transitions from a low level to a high level. In response, at time t22, the forcing pulse setting signal POUT transitions from a low level to a high level. The switching pulse generator 153 causes the generation frequency of the switching pulse SWP to change from a relatively low frequency to a relatively high frequency in response to the transition of the forcing pulse setting signal POUT from a low level to a high level. In this way, at time t22, the switching frequency of the thin-film transistor 12 becomes higher. For the time duration starting at time t22, the boost DC-DC converter 110 operates in the current continuation mode.

At time t23, the vertical blanking period PB transitions to the effective video period PA. At time t24, the enable signal ENA transitions from a high level to a low level. In response, at time t24, the forcing pulse setting signal POUT transitions from a high level to a low level. In this way, although the forcing pulse setting signal POUT is at a low level at time t24, time t24 is included in the effective video period PA. The generation frequency of the switching pulse SWP is thus maintained at a relatively high frequency.

In this example, the time duration from time t20 to time t21 and the time duration from time t22 to time t24 correspond to the first predetermined period. The time duration from time t20 to time t21 and the time duration from time t22 to time t24 correspond to multiple period segments included in the first predetermined period (two time durations).

The following discussion focuses on the waveform of the analog power supply voltage AVDD for the time duration from time t20 to time t25. If the measure disclosed in the specification is not taken, the voltage value of the analog power supply voltage AVDD is substantially lower than a desired voltage value during a time duration immediately after the transition from the vertical blanking period PB to the effective video period PA. According to the second embodiment, in contrast, a larger variation in the voltage value of the analog power supply voltage AVDD (namely, the occurrence of a larger ripple voltage) during the vertical blanking period PB may be controlled by supplying the control terminal of the thin-film transistor 12 with the switching pulse SWP at a relatively high frequency in response to the first pulse of the enable signal ENA. The falling of the voltage value of the analog power supply voltage AVDD below the desired voltage value during the time duration immediately after the transition from the vertical blanking period PB to the effective video period PA may be controlled by supplying the control terminal of the thin-film transistor 12 with the switching pulse SWP at a relatively high frequency in response to the second pulse of the enable signal ENA. As a result, as illustrated in FIG. 7, the voltage value of the analog power supply voltage AVDD is maintained to be high enough during the time duration immediately after the transition from the vertical blanking period PB to the effective video period PA.

2.3 Effect

The second embodiment, like the first embodiment, may provide the boost DC-DC converter 110 that consumes power lower than in the related art and results in a sufficiently higher output voltage after the transition from the vertical blanking period PB to the effective video period PA as a heavy-load period even when a voltage drop occurs in the output voltage (the analog power supply voltage AVDD) during the vertical blanking period PB as a light-load period. A liquid-crystal display apparatus including such a boost DC-DC converter may also be implemented.

3. Modifications

According to the first embodiment, the pulse of the enable signal ENA is generated once every vertical blanking period PB and according to the second embodiment, the pulse of the enable signal ENA is generated twice every vertical blanking period PB. The disclosure is not limited to this method. The pulse of the enable signal ENA may be generated three or more times every vertical blanking period PB.

According to the first and second embodiments, the boost DC-DC converter 110 operates with the effective video period PA as the heavy-load period and with the vertical blanking period PB as the light-load period. The disclosure is not limited to this method. The heave-load period and the light-load period may be interchanged depending on a display image.

According to the first and second embodiments, the boost DC-DC converter 110 is used in the liquid-crystal display apparatus. The disclosure is not limited to this configuration. The disclosure in the specification may be applicable to the boost DC-DC converter 110 used in an apparatus other than the liquid-crystal display apparatus.

4. Additional Notes

The disclosure has been described. The description of the disclosure is quoted for exemplary purposes only and is not intended to limit the disclosure. A variety of modifications and changes are possible without departing from the scope of the disclosure.

The present disclosure contains subject matter related to that disclosed in Japanese Priority Patent Application JP 2022-132321 filed in the Japan Patent Office on Aug. 23, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid-crystal display apparatus comprising:

a boost direct current to direct current (DC-DC) converter that boosts a power supply voltage supplied from outside, the DC-DC converter comprising:

an input terminal that is supplied with the power supply voltage;

an inductor having a first end connected to the input terminal;

a switching element having a control terminal, a first conductive terminal connected to a second end of the inductor, and a second conductive terminal grounded;

a switching control circuit that supplies the control terminal of the switching element with a control signal that controls a switching frequency of the switching element;

a capacitance element having a first end grounded;

a rectifying element that allows a current to flow only from the second end of the inductor to a second end of the capacitance element; and an output terminal that is connected to the second end of the capacitance element and outputs a power supply voltage that is boosted;

a display including a plurality of video signal lines, a plurality of scanning signal lines, and a plurality of pixel formation units that are respectively arranged at intersections of the video signal lines and the scanning signal lines;

a video signal line driver circuit that drives the video signal lines;

a scanning signal line driver circuit that drives the scanning signal lines; and a timing control circuit that controls an operation of the video signal line driver circuit, the scanning signal line driver circuit, and the switching control circuit, wherein the switching control circuit supplies the control terminal of the switching element with the control signal such that an operation mode transitions to a current continuation mode during a first predetermined period that is at least a portion of a time duration that continues from a moment when the operation mode transitions from the current continuation mode to a current discontinuation mode in response to transitioning from a heavy-load period to a light-load period to a moment when the light-load period transitions to the heavy-load period, wherein the timing control circuit comprises:

a setting register that stores a set value identifying the first predetermined period; and an enable signal generator circuit that generates an enable signal including a pulse responsive to the set value stored in the setting register, wherein the switching control circuit supplies the control terminal of the switching element with the control signal such that the operation mode transitions to the current continuation mode during the first predetermined period in response to the pulse included in the enable signal.

2. The liquid-crystal display apparatus according to claim 1, wherein the setting register stores, as the set value, a value identifying a rising point of the pulse included in the enable signal and a value identifying a pulse width of the pulse included in the enable signal.

3. The liquid-crystal display apparatus according to claim 1, wherein the switching control circuit sets to be the first predetermined period a time duration throughout which a second predetermined period overlaps the pulse included in the enable signal, the second predetermined period having a predetermined time length starting at a moment when the power supply voltage after being boosted exceeds a threshold.

4. The liquid-crystal display apparatus according to claim 1, wherein the switching control circuit sets to be the first predetermined period a time duration throughout which the pulse included in the enable signal occurs.

5. The liquid-crystal display apparatus according to claim 1, wherein the switching control circuit is supplied with a mode signal indicating whether a control mode is a first mode or a second mode, wherein if the mode signal indicates that the control mode is the first mode, the switching control circuit sets to be the first predetermined period a time duration throughout which a second predetermined period overlaps the pulse included in the enable signal, the second predetermined period having a predetermined time length starting at a moment when the power supply voltage after being boosted exceeds a threshold, and wherein if the mode signal indicates that the control mode is the second mode, the switching control circuit sets to be the first predetermined period a time duration throughout which the pulse included in the enable signal occurs.

* * * * *